Feb. 21, 1967   R. R. WALSH   3,305,755
DUAL CONTROL BATTERY CHARGER
Filed April 24, 1964
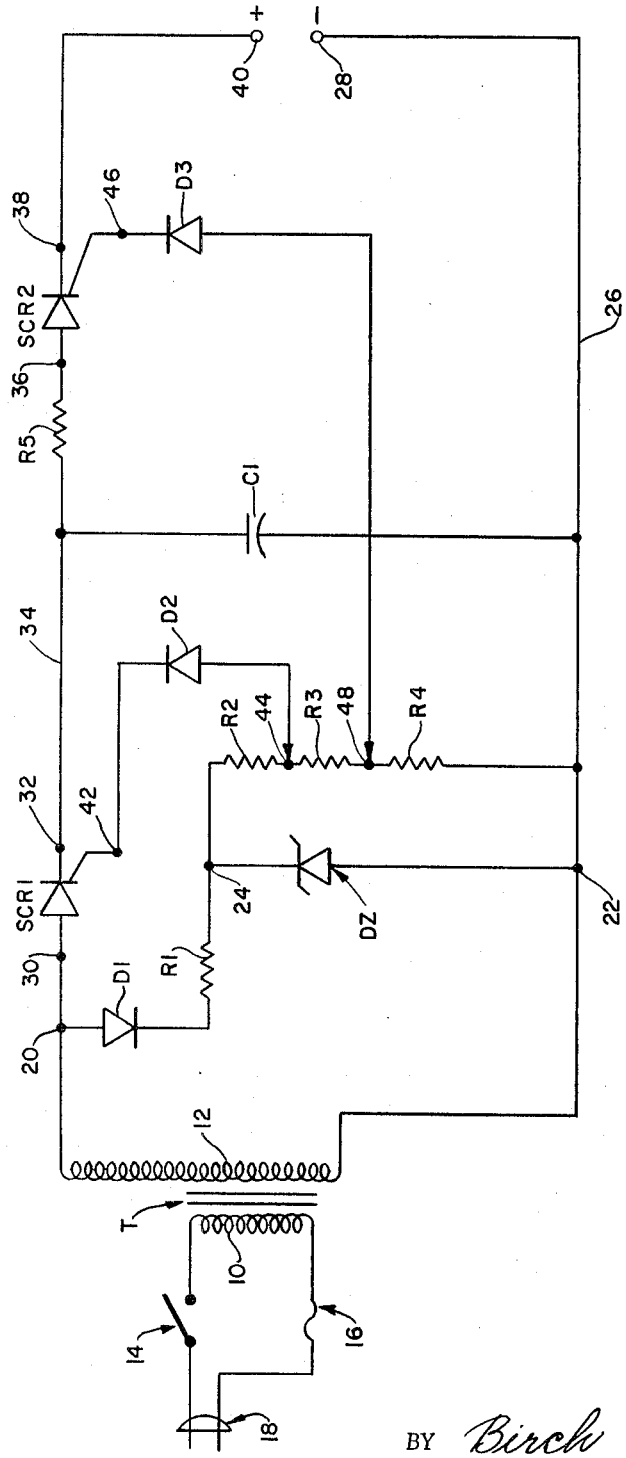
INVENTOR
Robert R. Walsh
BY *Birch and O'Brien*
ATTORNEYS

United States Patent Office 3,305,755
Patented Feb. 21, 1967

3,305,755
DUAL CONTROL BATTERY CHARGER
Robert R. Walsh, Wilmington, Del., assignor to All American Engineering Company, Wilmington, Del., a corporation of Delaware
Filed Apr. 24, 1964, Ser. No. 362,358
12 Claims. (Cl. 320—40)

This application is a continuation-in-part of my copending application Serial No. 250,624 filed January 10, 1963.

This invention relates to battery chargers which monitor the terminal voltage of the battery or other load to which they supply energy and more particularly to such chargers wherein the characteristic of the battery or load is such that charging must be automatically initiated when the terminal voltage of said battery or load falls below a first preselected value and continues until the said terminal voltage reaches a second preselected value, higher than said first value, at which point charging automatically terminates.

It is an object of this invention to provide an inexpensive and highly sensitive battery charger including automatic battery terminal voltage monitoring means which automatically initiates charging of said battery when said terminal voltage falls below a first preselected value and automatically terminates charging of said battery when said terminal voltage reaches a second preselected value higher than said first value.

Another object of this invention is to provide an inexpensive and highly sensitive battery charger including automatic battery terminal voltage monitoring means which automatically initiates charging of said battery when said terminal voltage falls below a first preselected value and automatically terminates charging of said battery when said terminal voltage reaches a second preselected value higher than said first value; said battery charger including first and second battery terminal voltage monitoring means, respectively, for said first and second preselected values of terminal voltage for respectively automatically initiating and automatically terminating the charging of said battery.

These and other objects of this invention will become more fully apparent with reference to the following specification and drawings which relate to several preferred embodiments of the invention.

In the drawing:

The drawing comprises a schematic diagram of a first embodiment of a battery charger under the present invention.

Referring in detail to the drawing, the battery charger of the invention is shown as including an input transformer T having a primary winding 10 and a secondary winding 12, the primary 10 being connected in series with an on-off switch 14 and a fuse 16 and adapted to be connected across any suitable alternating current supply by means of a power plug 18.

The secondary 12, of the transformer T, includes first and second output terminals 20 and 22, respectively, across which is connected a rectifier diode D1 in series with a dropping resistor R1, and a Zener diode $D_Z$, the cathode terminal of the said Zener doide and the resistor R1 being connected at a common node 24.

The second output terminal 22 of the secondary 12 is connected through a common lead 26 directly to the negative output terminal 28 of the battery charger.

A voltage standard is provided by means of a voltage divider comprising second, third and fourth series connected dropping resistors R2, R3 and R4, respectively, connected across the Zener diode $D_Z$ from the node 24 between the rectifier diode D1 and Zener diode $D_Z$ to the common lead 26.

The first output terminal 20 of the secondary 12 is connected, via a series circuit comprising anode terminal 30 and cathode terminal 32 of a first silicon controlled rectifier SCR1 (hereinafter referred to merely as the SCR1), lead 34, current limiting resistor R5, anode terminal 36 and cathode terminal 38 of a second silicon controlled rectifier SCR2 (hereinafter referred to merely as the SCR2), with the positive output terminal 40 of the battery charger.

The SCR1 includes a gate terminal 42 which is connected through a first isolating diode D2 to a first reference junction 44 common to the second and third dropping resistors R2 and R3. The diode D2 is connected at its anode to the first reference node 44 and at its cathode to the gate terminal 42 of the SCR1.

The SCR2 includes a gate terminal 46 which is connected through a second isolating diode D3 to a second reference junction 48 common to the third and fourth dropping resistors R3 and R4. The diode D3 is connected at its anode to the first reference junction 48 and at its cathode to the gate terminal 46 of the SCR2.

A capacitor load C1 for the SCR1 is connected from the cathode 32 of the SCR1, at the lead 34, to the common negative lead 26.

Operation

Assuming that A.C. power is applied to the plug 18 and switch 14 is closed and that, therefore, the transformer T is energized, the voltage across the secondary output terminals 20 and 22 is rectified by the first diode D1, delivering direct current power to the node 24 via the first dropping resistor R1.

The relative values of the first resistor R1 and the sum of the values of the second, third and fourth resistors R2, R3 and R4 is such that the Zener diode $D_Z$ will break down and conduct in the reverse direction in response to the initial voltage appearing at the node 24, whereby, thereafter a regulated standard voltage appears across the voltage divider comprised of the said second, third and fourth resistors.

By selectively adjusting the relative values of the second, third and fourth resistors R2, R3 and R4, respectively, such as by constituting the first and second reference junctions 44 and 48, respectively, as variable taps on the voltage divider R2–R3–R4, the first and second gating voltages respectively applied from said reference junctions to the gate terminals 42 and 46, respectively, of the SCR1 and SCR2, are constrained to the proper values with respect to the particular conditions of operation.

A battery, not shown, is connected in charging position across the output terminals 40 and 28.

The gating voltage from the first reference junction 44 causes the SCR1 to conduct and charge the load capacitor C1 to the voltage equal to that of the said first reference junction 44, the said junction being protected by the first isolating diode D5 from the effects of reverse gate current from the gate terminal 42 when the SCR1 is conducting. The SCR1 then cuts off on the next half-cycle of A.C. power from the secondary terminals 20 and 22.

The ultimate charged potential of the load capacitor C1 is controlled in this manner since it is a characteristic of silicon controlled switching devices that they will not conduct except when a small control current determined by a forward bias or gating potential is flowing in a forward direction into the gating terminal thereof, the silicon controlled switching means SCR will be biased to cut off and effectively appear to be an open circuited switch when the potential difference between the gating voltage at the gate terminal 42 and the voltage at the cathode terminal 32, the latter in this case being the terminal voltage of the load capacitor C1, drops below a predetermined minimum for the particular type silicon controlled switching device used. For example, a silicon controlled switch such as a G.E. Type C5U or a silicon controlled rectifier such as a G.E. Type C15U may be used as the silicon controlled switch means SCR1 in the present invention.

The load capacitor C1 supplies D.C. power to the anode terminal 36 of the SCR2 through the limiting resistor R5.

Whenever the battery terminal voltage drops below that of the second reference junction 48, the SCR2 conducts, as already described above with reference to the SCR1, due to the presence of gating voltage from the said second junction at the gate terminal 46 thereof, and causes the capacitor C1 to discharge through the SCR2 and deliver charging current to the battery at the output terminals 40 and 28.

As the load capacitor C1 discharges, the terminal voltage thereof drops, causing the SCR1 to become conducting and maintain the said terminal voltage of the capacitor C1 at its preselected value.

Since the SCR2 is still being supplied with D.C. power at its anode terminal 36 from the load capacitor C1, it is held in a conducting state even though the battery terminal voltage will eventually rise above the voltage of the second reference junction 48. (The said second junction 48 is protected from reverse current effects by the second isolating diode D3 when the SCR2 is conducting.)

Thus, the battery will continue to charge until the terminal voltage thereof is equal to the voltage of the first reference junction 44 and the terminal voltage of the load capacitor C1. When this condition occurs C1 will no longer discharge and the SCR1 will cut off on the next half-cycle of A.C. power. Also, since the voltages at the anode terminal 36 and cathode terminal 38 of the SCR2 are the same, there is no anode-cathode drop through the SCR2 and it will also be rendered non-conducting, thereby terminating the charging cycle.

Therefore, the first preselected value of battery terminal voltage automatically causing initiation the charging cycle is determined by the gating voltage appearing at the second reference junction 48 and the second preselected value of battery terminal voltage automatically causing termination of the charging cycle is determined by the gating voltage appearing at the first reference junction 44.

It will be apparent that methods known in the art can be applied for compensating the various components of this circuit against thermal drift of characteristics resulting from changes in ambient temperature should such additional stability be required.

As can be seen from the foregoing specification and drawings, this invention provides a battery charger which is inexpensive, compact and highly sensitive and which automatically monitors the terminal voltage of a battery being charged thereby and automatically initiates and terminates the charge cycle upon the advent of first and second predetermined terminal voltages, respectively, at the said battery.

It is to be understood, that the embodiments of the invention shown and described herein are for the purpose of example only and are not intended to limit the scope of the appended claims.

What is claimed is:

1. Charging means for delivering charging current to a load, said load having a predetermined minimum terminal voltage and a predetermined maximum terminal voltage, said charging means comprising a power source, circuit means connected with said power source deriving first and second voltage standards therefrom equal to said predetermined minimum and maximum terminal voltages, respectively, first and second semiconductor switch means connected in series with said power source and said load, said first and second switch means including first and second gate terminals, respectively, conductor means applying said second voltage standard to said first gate terminal and said first voltage standard to said second gate terminal and capacitance load means connected in series with said first semiconductor switch means and in parallel with said load.

2. The invention defined in claim 1, wherein said conductor means includes first and second diodes connected in forward direction from said circuit means to said first and second gate terminals, respectively.

3. The invention defined in claim 1, wherein said semiconductor switch means each comprise a silicon controlled rectifier means, said rectifier means having anode and cathode terminals in series with said power source and said load, and wherein said charging means further includes a current limiting resistance means connected in series between said power source and said second rectifier means.

4. The invention defined in claim 1, wherein said semiconductor switch means each comprise a silicon controlled rectifier means, said rectifier means having anode and cathode terminals in series with said power source and said load, and wherein said charging means further includes a current limiting resistance means connected in series between said first and second rectifier means.

5. The invention defined in claim 1, wherein said circuit means comprises rectifier means, first resistance means and voltage divider means connected in series across said power source, said voltage divider means including first and second reference junctions, and voltage regulator means connected across said voltage divider means maintaining said predetermined maximum and minimum voltages at said first and second reference junctions, respectively, said first and second reference junctions being connected through said conductor means to said first and second gate terminals, respectively.

6. The invention defined in claim 5, wherein said conductor means comprise first diode means connected in forward direction from said first reference junction to said first gate terminal and second diode means connected in forward direction from said second reference junction to said second gate terminal.

7. The invention defined in claim 1, wherein said semiconductor switch means each comprise a silicon controlled rectifier means, said rectifier means having anode and cathode terminals in series wtih said power source and said load, and wherein said charging means further includes a current limiting resistance means connected in series between said power source and said second rectifier means; and wherein said circuit means comprises rectifier means, first resistance means and voltage divider means connected in series across said power source, said voltage divider means including first and second reference junctions, and voltage regulator means connected across said voltage divider means maintaining said predetermined maximum and minimum voltages at said first and second reference junctions respectively, said first and second reference junctions being connected through said conductor means to said first and second gate terminals, respectively.

8. The invention defined in claim 7, wherein said semiconductor switch means each comprise a silicon controlled rectifier means, said rectifier means having anode and cathode terminals in series with said power source and said load, and wherein said charging means further includes a current limiting resistance means connected in series between said first and second rectifier means.

9. The invention defined in claim 7, wherein said conductor means comprise first diode means connected in forward direction from said first reference junction to said first gate terminal and second diode means connected in forward direction from said second reference junction to said second gate terminal.

10. The invention defined in claim 7, wherein said semiconductor switch means each comprise a silicon controlled rectifier means, said rectifier means having anode and cathode terminals in series with said power source and said load, and wherein said charging means further includes a current limiting resistance means connected in series between said first and second rectifier means; and wherein said conductor means comprise first diode means connected in forward direction from said first reference junction to said first gate terminal and second diode means connected in forward direction from said second reference junction to said second gate terminal.

11. In a battery charger for delivering charging current to a load, said load having predetermined minimum and maximum terminal voltages, first means responsive to said minimum terminal voltage automatically initiating the delivery of charging current to said load and second means responsive to said maximum terminal voltage automatically terminating the delivery of charging current to said load, said first means comprising first semiconductor switch means biased to conduct initially when said load voltage drops below said predetermined minimum and said second means comprising second semiconductor switch means and second load means in series therewith and in parallel with said first semiconductor switch means, said second semiconductor switch means being biased to conduct and charge said second load means to said maximum terminal voltage of the first said load.

12. The invention defined in claim 11, wherein there is further included current limiting means in series between said first and second semiconductor switch means.

References Cited by the Examiner

UNITED STATES PATENTS

| | | | |
|---|---|---|---|
| 3,100,268 | 8/1963 | Foote | 307—88.5 |
| 3,158,799 | 11/1964 | Kelley et al. | 321—27 |
| 3,160,805 | 12/1964 | Lawson | 320—39 |
| 3,226,625 | 12/1965 | Diebold | 321—27 |

JOHN F. COUCH, *Primary Examiner.*

S. WEINBERG, *Assistant Examiner.*